March 24, 1953
G. E. STOLTZ
2,632,862
REGULATING SYSTEM
Filed May 2, 1950
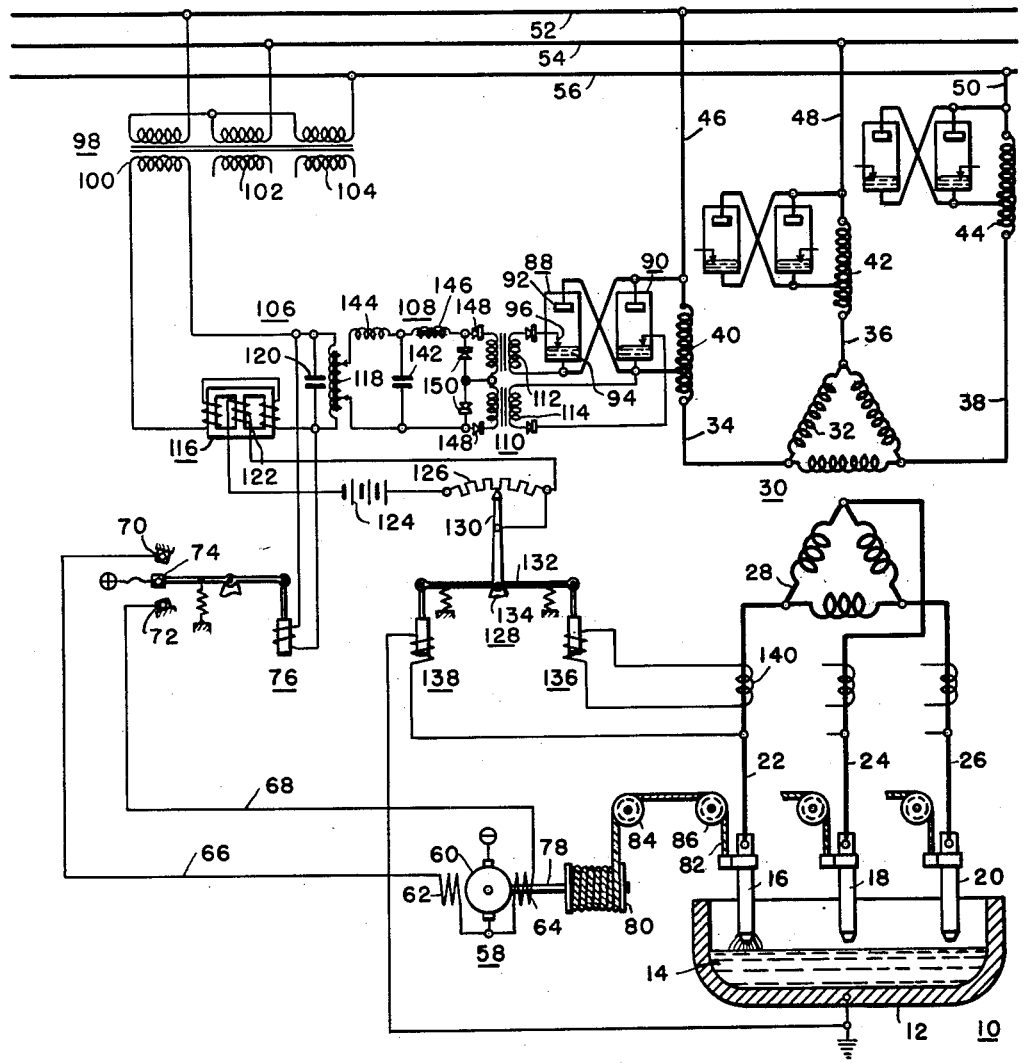
WITNESSES:
INVENTOR
Glenn E. Stoltz.
BY
James K. Ely
ATTORNEY Patented Mar. 24, 1953

2,632,862

UNITED STATES PATENT OFFICE 2,632,862

REGULATING SYSTEM

Glenn E. Stoltz, Pittsburgh, Pa., assignor to Westinghouse Electric Corporation, East Pittsburgh, Pa., a corporation of Pennsylvania Application May 2, 1950, Serial No. 159,520

4 Claims. (Cl. 314—73)

This invention relates to regulating systems and, in particular, to arc furnace regulator systems.

Arc furnaces and their operation are well known in the art. In general, there are three periods of melting down and refining of the metallic composition, usually rough scrap metal in the arc furnace, the first period being that necessary for melting the composition to the degree where the composition can be considered as being one body even though it is not completely melted. The next period is that covered by the complete melting of the composition, whereas the third period is the actual refining of the molten composition, such refining requiring only sufficient power for taking care of radiation losses and holding the bath at a given temperature.

During the first two of these periods, the furnace load may fluctuate to cause high surges on the power supply system unless care is exercised to control the current load. This may be appreciated when it is considered that pieces of the scrap metal composition may fall against the electrode, thus causing a direct short circuit or the pieces may fall away from the electrode to thereby reduce the load to a small value or to even extinguish the arc.

The usual regulating systems attempt to correct for such fluctuations in load by controlling the position of the electrodes to maintain a desired arc current and arc potential. However, the adjustment of the position of the electrode is comparatively slow, with the result that the sudden changes in current drawn from the power circuit is not prevented, and objectionable variations in line voltage are encountered. The latter is particularly objectionable where the electric arc furnace is supplied from a power source which is being used to supply other apparatus, such as lighting equipment.

An object of this invention is to provide in an electric arc regulating system for effecting a quick response to a change in load to limit the current flow to the load.

Another object of this invention is to provide in an arc furnace regulator system for an initial quick response to limit the current flow upon a change in load conditions while simultaneously therewith initiating a change in the positioning of the electrodes.

Other objects of this invention will become apparent from the following description when taken in conjunction with the accompanying drawing, the single figure of which is a diagrammatic view of an arc furnace regulating system embodying the teachings of this invention.

Referring to the drawing, an electric furnace 10 is illustrated, the furnace comprising a grounded receptacle 12 containing a bath of metallic material 14 and three movable electrodes 16, 18 and 20. The electrodes 16, 18 and 20 are connected by conductors 22, 24 and 26, respectively, to the secondary winding 28 of a polyphase transformer 30, the primary winding 32 of which is connected by conductors 34, 36 and 38, respectively, to reactors 40, 42 and 44, respectively, the other end of the reactors being connected by conductors 46, 48 and 50, respectively, to the three-phase supply circuit comprising conductors 52, 54 and 56, respectively.

Each of the movable electrodes is provided with a reversible motor for raising and lowering it and a regulating system for limiting the current flow to the electrode and for governing the operation of the motor in accordance with changes in the current flowing through the electrode and the potential across the electrode arc. Since the regulating system associated with each electrode and motor is of like construction and operates in the same manner, only one of the regulating systems and motors for limiting the current flow and controlling the positioning of the electrodes is illustrated.

In the drawing, a reversible motor 58 comprising an armature winding 60 and two opposed series field windings 62 and 64 is illustrated for raising and lowering the electrode 16. As illustrated, one end of the armature winding 60 is connected to the negative terminal of a source of power, the other end of the armature 60 being connected to one end of each of the opposed series field windings 62 and 64. The other ends of the field windings 62 and 64 are connected by conductors 66 and 68, respectively, to the spaced stationary contact members 70 and 72, respectively, and are disposed to be connected to the positive terminal of the source of supply by the movable contact member 74 which is actuated by the relay 76, as will be explained more fully hereinafter. The armature 60 of the motor 58 is mechanically connected to the electrode 16 in any suitable manner for effecting movement thereof and in the embodiment illustrated is connected by the shaft 78, a winding drum 80 and a flexible conductor 82 which passes over pulleys 84 and 86.

As illustrated, in order to control the current supplied to the electrodes, a pair of make-alive valves 88 and 90 are disposed and so connected 180° apart as to shunt a part or all of the reactor 40 when the valves are alternately conducting. A similar pair of valves is connected in circuit relation with each of the reactors 42 and 44 connected in the other phases of the input circuit. The valves 88 and 90 are of standard construction having an anode 92, a cathode 94, and a make-alive electrode or immersion igniter control member 96 normally in permanent contact with the cathode 94. In the circuit illustrated, the make-alive valves 88 and 90 are connected to the supply circuit 52, 54 and 56, a transformer 98 being connected thereto for supplying a control potential to the pair of valves 88 and 90. The transformer 98 is provided with a plurality of secondary windings 100, 102 and 104 which are so connected as to supply the control potential to the pair of valves associated with the reactors 40, 42 and 44, respectively. The control potential circuit for supplying the valves 88 and 90 is formed of a constant potential network 106 and a wave-shape transforming circuit 108 disposed between the secondary winding 100 of transformer 98 and a transformer 110, the secondary windings 112 and 114 of which are connected across the make-alive electrode 96 and the cathode 94 of the valves 88 and 90, respectively.

The constant potential network 106 comprises a suitable three legged reactor 116 preferably of the non-linear or saturable variety in series with the supply of control potential, a second saturable reactor 118 in shunt with the control potential and a capacitor 120 in shunt with the saturable reactor 118. By suitably varying the reactance of the non-linear reactor 116, the phase angle of the control potential may be shifted. The reactance of the reactor 116 is controlled by applying a variable direct-current biasing potential on the direct-current winding 122 carried on the center leg of the reactor 116 from a battery 124 by adjusting a rheostat 126 which is connected in series therewith.

The rheostat 126 is controlled by a balanced beam type of regulator 128 in response to changes in the current flowing in the electrodes 16 and of the potential across the arc. As illustrated, the balanced beam regulator 128 is provided with a movable arm 130, the end of which is in electrical engagement with rheostat 126 and which is connected to one end of the rheostat for effectively shunting or connecting the rheostat in circuit as the arm 130 is actuated. The arm 130 is carried on the beam 132 which is pivotally supported as at 134, control electromagnets 136 and 138 being disposed at each end of the beam 132 responsive to current and to voltage changes, respectively. The winding of the electromagnet 136 is connected by the current transformer 140 to be responsive to the current flowing through the electrode 16, whereas the winding of the electromagnet 138 is connected across the conductor 22 and the receptacle 12 to be responsive to the arc potential.

The constant potential network draws a larger load current than the firing circuit for the valves 88 and 90 alone but, in turn, acts as a source of power for the firing circuit. The parallel combination of the capacitor 120 and the reactor 118 is preferably designed so that at 100% supply voltage the combination will draw the minimum of current. If the supply voltage should for any reason be lowered, then the capacitor 120 draws a charging current in excess of the magnetizing current of reactor 118 which, in conjunction with the load current, causes a leading current to be drawn through the phase-shifting reactor 116, thus causing a drop for maintaining substantially full-voltage supply to the wave distorter circuit 108. On the other hand, if the supply voltage is high, then the saturating reactor 118 draws a magnetizing current in excess of the charging current drawn by the capacitor 120 which, in conjunction with the load current, causes a lagging current to be drawn through the phase-shifting reactor 116, thus causing a drop which maintains the voltage at the wave-distorter circuit substantially constant. The constant potential network 106 thus makes it possible to obtain as great as a 90° phase shift with no appreciable change in peak voltage output while at the same time maintaining substantial constant voltage at the wave distorter circuit even though the supply voltage changes as much as 30%.

The wave-shape transforming or distorting circuit 108 comprises a capacitor 142 connected in shunt with the constant potential network with an impedance such as a resistor or the linear reactor 144 connected therebetween for controlling current flow to the capacitor 142. The opposite sides of the capacitor 142 are connected to the outer terminals of transformer 110, a non-linear inductance such as the saturating reactor 146 being connected between the common terminal of reactor 144 and capacitor 142 and the transformer. The saturating reactor produces sharply peaked impulses of alternating polarity which are supplied to the transformer.

In order to control the potential of the primary windings of the transformer 110, suitable rectifier elements and unidirectional conducting devices 148 are connected between the wave-distorter circuit and the primary winding of the transformer, whereas rectifier elements 150 are connected across the wave-distorter circuit and to the common tap of the primary windings of the transformer 110. In addition, rectifier elements are disposed in circuit with the secondary windings 112 and 114 and the associated make-alive electrodes 96 for controlling the direction of current flow thereto. By this means, the primary windings of the transformer 110 are alternately energized and by-passed and the valves 88 and 90 are alternately fired to control the current flowing to the primary winding 32 of the transformer 30.

In operation, assuming that the system is energized and in the position shown with the electrodes 16, 18 and 20 in position for maintaining an arc with the metallic composition 14, the system is in substantial balance, the current flowing through the electrode and the potential across the arc being of some predetermined value. If for any reason the system becomes unbalanced such as where a part of the metal of the bath 14 falls in on the electrode 16, a direct short circuit is encountered with the result that the current flowing through the electrode is greatly increased. Immediately upon the increase in the current flowing through the electrode 16, the winding of the electromagnet 136 of the balanced beam regulator 128 is so energized and the winding of the potential electromagnet is so deenergized that the beam 132 pivots in a clockwise direction about its pivot 134 to connect additional sections of the rheostat 126 in circuit with the battery 124 and the direct-current winding 122 of reactor 116.

The connecting of additional sections of the rheostat 126 in circuit with the direct-current winding 122 immediately effects a decrease in the direct current flowing through the winding 122 and thereby effects an increase in the reactance of the reactor 116 to so shift the phase of the control potential supplied from the secondary winding 100 as to retard the firing time of the pair of valves 88 and 90 and thereby decrease the current passed by the valves 88 and 90 to immediately limit the current supplied to the furnace.

At the same time that the phase angle of the control voltage is changed to effect an immediate change in the current supplied to the furnace, the change in the reactance of reactor 116 effects a decrease in the voltage across the conductors to which the parallel connected capacitor 120 and reactor 118 are connected. This decrease in the voltage effects a decrease in the energization of the winding of relay 76 whereby the movable contact member 74 is actuated into engagement with the stationary contact member 72 to close the circuit extending from the positive terminal of the source of supply through the contact members 74 and 72, conductors 68, field winding 64 and the armature winding 60 to the negative terminal of the source of supply to effect an operation of the motor 58 whereby the electrode 16 is raised to effectively decrease the current flowing through the electrode and increase the arc potential.

If, on the other hand, the change in the current flowing through the electrode 16 is a decrease, as by reason of the metallic composition 14 falling away from the electrode 16, then the electromagnet 138 is so energized and the electromagnet 136 is so deenergized as to effect a counterclockwise movement of the beam 132 about its pivot 134 to effectively shunt more of the rheostat 126 from the circuit with the battery 124 and the direct-current winding 122 to thereby increase the direct-current flowing in the winding 122 and decrease the reactance in the constant potential circuit. This decrease in the reactance of reactor 116 so changes the phase angle of the control voltage as to effect an advance in the firing time of the valves 88 and 90 whereby the valves 88 and 90 pass more current to immediately increase the current supplied to the arc furnace.

At the same time, the change in the reactance of reactor 116 in the constant potential circuit effects an increase in the voltage across the conductors to which the winding of the relay 76 is connected whereby the relay 76 is so energized as to actuate the movable contact member 74 into engagement with the stationary contact member 70 to close a circuit which may be traced from the positive terminal of the source of supply through contact members 74 and 70, conductor 66, field winding 62 and the armature winding 60 to the negative terminal of the source of supply to cause the motor 58 to operate in such a direction as to lower the electrode 16, and thereby increase the current flowing through the electrode and decrease the arc potential.

In the system of this invention, it will be appreciated that if the current flow through the electrode 16 is excessive and of sufficient magnitude that the reactance of reactor 116 will be so changed as to render the valves 88 and 90 inoperative, the reactor 40 will be connected to the supply circuit and will immediately limit the current flow to a safe and satisfactory value even though the furnace electrode 16 is short circuited. By connecting the valves 88 and 90 in the manner described in circuit with a portion of the reactor 40, the amount of current flowing under condition of minimum arc voltage drop can be adjusted.

The system described is very sensitive to changes in current and voltage effecting an immediate operation to control the current supplied thereto while at the same time providing for initiating a physical movement of the electrode 16 to position the electrode and thereby provide a positive control of the arc current and arc potential. The advantage of the quick response regulating feature in conjunction with the slower responsive motor operation can be readily appreciated for if the short circuit is of only momentary duration, the necessary protection against excessive current is obtained and where the short circuit is only of momentary duration, the protection thus obtained is sufficient without effecting a physical movement of the electrode 16, since the time delay in the actuation of the motor 58 may be so large that the surge is over before the motor is energized for operation.

I claim as my invention:

1. In an arc-furnace regulator system, in combination, a source of alternating-current power supply, a movable electrode connected to the power supply for drawing an arc, a motor disposed for raising and lowering the electrode, a pair of make-alive valves connected in circuit between the power supply and the electrode, the make-alive valves being disposed for firing to alternately pass current from the power supply to the electrode, a source of control potential for the valves, a phase-shifting circuit including a variable reactor connected in series with the output of the source of control potential, a reactor and a capacitor connected across the source of control potential and the variable reactor, circuit means disposed to be responsive to the current flow through the movable electrode and to be responsive to the voltage across the electrode arc to produce a signal that is a measure of the arc current and the arc voltage, the variable reactor being responsive to the magnitude of said signal to thus vary the reactance of the variable reactor to shift the phase angle of the control potential to control the firing of the tubes and thereby control the current flow through the movable electrode, and means also responsive to said signal for controlling the motor to position the movable electrode.

2. In an arc-furnace regulator system, in combination, a source of alternating-current power supply, a movable electrode connected to the power supply, a motor disposed for raising and lowering the electrode, a pair of make-alive valves connected in circuit between the power supply and the electrode, the make-alive valves being disposed for firing to alternately pass current from the power supply to the electrode, a source of control potential for the valves, a phase-shifting circuit including a variable reactor connected in series with the output of the source of control potential, a reactor and a capacitor connected across the source of control potential and the variable reactor, means responsive to the arc current and the arc potential for varying the reactance of the variable reactor to shift the phase relation of the control potential, a wave distorter circuit fed by the source of control potential through the phase-shifting circuit, a make-alive electrode in each of the valves, means for selectively energizing the make-alive electrodes from the output of the wave distorter circuit to control the firing of the tubes and thereby control the current flow to the electrode, and means also responsive to the arc current and arc potential for controlling the motor to position the electrode.

3. In an arc-furnace regulator system, in combination, a source of alternating-current power supply, a movable electrode connected to the power supply, a motor disposed for raising and lowering the electrode, an impedance connected in circuit between the power supply and the electrode, a pair of make-alive valves disposed to alternately shunt at least a portion of the impedance, a source of control potential for the valves, a phase-shifting circuit including a variable reactor connected in series with the output of the source of control potential, a reactor and a capacitor connected across the source of control potential and the variable reactor, means responsive to the arc current and the arc potential for varying the reactance of the variable reactor to shift the phase relation of the control potential, a wave distorter circuit fed by the source of control potential through the phase-shifting circuit, a make-alive electrode in each of the valves, means for selectively energizing the make-alive electrodes from the output of the wave distorter circuit to control the firing of the tubes and thereby control the current flow to the electrode, and means also responsive to the arc current and arc potential for controlling the motor to position the electrode.

4. In an arc furnace regulator system, in combination, a source of alternating current power supply, a movable electrode connected to the power supply, a motor disposed for raising and lowering the electrode, a pair of make-alive valves connected in circuit between the power supply and the electrode, the make-alive valves being disposed for firing to alternately pass current from the power supply to the electrode, a source of control potential for the valves, circuit means associated with the movable electrode to produce a signal that is a measure of the arc current and the arc potential, means responsive to the signal for shifting the phase relation of the control potential to control the firing of the tubes and thereby control the current flow to the electrode, and means also responsive to the signal for controlling the motor to position the electrode.

GLENN E. STOLTZ.

REFERENCES CITED

The following references are of record in the file of this patent:

UNITED STATES PATENTS

| Number | Name | Date |
| --- | --- | --- |
| 1,573,095 | Saklatwalla et al. | Feb. 16, 1926 |
| 1,969,550 | Evans | Aug. 7, 1934 |
| 2,242,948 | Gulliksen | May 20, 1941 |
| 2,248,020 | Freudenhammer | July 1, 1941 |
| 2,259,958 | Levy | Oct. 21, 1941 |
| 2,441,789 | Bivens | May 18, 1948 |

FOREIGN PATENTS

| Number | Country | Date |
| --- | --- | --- |
| 596,726 | Great Britain | Jan. 9, 1948 |